(12) United States Patent
Bohman

(10) Patent No.: US 7,739,804 B2
(45) Date of Patent: Jun. 22, 2010

(54) HANDS-FREE LONG LEVEL

(75) Inventor: Roger A. Bohman, Franklin, WI (US)

(73) Assignee: Empire Level Mfg. Co., Mukwonago, WI (US)

( * ) Notice: Subject to any disclaimer, the term of this patent is extended or adjusted under 35 U.S.C. 154(b) by 93 days.

(21) Appl. No.: 12/208,201

(22) Filed: Sep. 10, 2008

(65) Prior Publication Data

US 2010/0058601 A1    Mar. 11, 2010

(51) Int. Cl.
*G01C 9/28* (2006.01)
(52) U.S. Cl. .......................................... 33/372; 33/371
(58) Field of Classification Search ................... 33/370, 33/371, 372, 373, 379; 248/229.13; 269/19; D10/69
See application file for complete search history.

(56) References Cited

U.S. PATENT DOCUMENTS

| | | | |
|---|---|---|---|
| 1,111,677 A | 9/1914 | Schade | |
| 1,263,229 A | 4/1918 | Gordon | |
| 1,264,484 A | 4/1918 | Bridgman | |
| 1,308,699 A * | 7/1919 | Cusick | 33/343 |
| 1,435,054 A | 11/1922 | Drummond | |
| 1,545,932 A | 7/1925 | Williams | |
| 1,612,843 A | 1/1927 | Timmis | |
| 1,620,469 A | 3/1927 | Kirkhoff | |
| 1,796,743 A | 3/1931 | Biedenfeld | |
| 2,314,927 A | 3/1943 | Farrington | |
| 2,531,563 A | 11/1950 | Feldheim | |
| 2,624,118 A | 1/1953 | Anderson | |
| 2,638,134 A | 5/1953 | Kearney | |
| 2,915,273 A | 12/1959 | Gavrun, Sr. | |
| 3,296,708 A | 1/1967 | Moody | |
| 3,707,772 A * | 1/1973 | Cotter | 33/373 |
| 3,851,401 A | 12/1974 | Dearman | |
| 4,066,232 A | 1/1978 | Hermeyer | |
| 4,663,856 A * | 5/1987 | Hall et al. | 33/373 |
| 4,829,676 A * | 5/1989 | Waldron | 33/372 |
| 4,843,728 A | 7/1989 | Francis | |
| 4,970,796 A | 11/1990 | Masters et al. | |
| 5,088,205 A | 2/1992 | Egbert | |
| 5,127,167 A | 7/1992 | Kennedy | |
| 5,148,605 A | 9/1992 | Julia | |
| 5,442,864 A | 8/1995 | Erman | |
| 5,581,900 A | 12/1996 | Payne | |

(Continued)

*Primary Examiner*—R. A. Smith
(74) *Attorney, Agent, or Firm*—Jansson Shupe & Munger Ltd.

(57) ABSTRACT

A level for gauging stud orientation. The level includes an elongate frame, a level indicator secured to the frame, two support arms pivotably secured to the frame to facilitate holding of the level against the stud, and a coordinating arm pivotably secured to each of the support arms for synchronous movement of the support arms. The frame has two side-faces and at least one main reference surface extending therealong and having a mainwidth. The coordinating arm is substantially parallel to the main reference surface. Each support arm has a proximal end and extends to a free distal end to which an end member is secured. Each end member extends from a respective one of the distal ends crosswise with respect to the mainwidth and terminates in a stud-engaging portion which extends in a direction intersecting the plane of the reference surface. When the reference surface is against a stud surface the stud-engaging portions engage the opposite side of the stud for hands-free holding of the level thereagainst.

20 Claims, 14 Drawing Sheets

U.S. PATENT DOCUMENTS

| | | | |
|---|---|---|---|
| 5,749,151 A * | 5/1998 | Scott et al. .................... 33/370 |
| 5,799,404 A | 9/1998 | Payne |
| 5,815,937 A | 10/1998 | Glorioso et al. |
| 5,819,425 A | 10/1998 | Payne |
| 5,820,476 A | 10/1998 | Amato |
| 6,026,581 A | 2/2000 | Gruetzmacher |
| 6,131,298 A | 10/2000 | McKinney et al. |
| 6,158,134 A | 12/2000 | Warner, Jr. et al. |
| 6,332,277 B1 | 12/2001 | Owoc et al. |
| 6,351,875 B1 | 3/2002 | Wright et al. |
| 6,502,322 B2 * | 1/2003 | Smochek .................... 33/373 |
| 6,640,456 B2 | 11/2003 | Owoc et al. |
| 6,796,045 B2 | 9/2004 | Hallee |
| 7,117,606 B2 | 10/2006 | Brown |
| 2001/0034945 A1 | 11/2001 | Smochek |
| 2004/0000063 A1 | 1/2004 | Hallee |
| 2005/0120572 A1 | 6/2005 | Valenti |

* cited by examiner

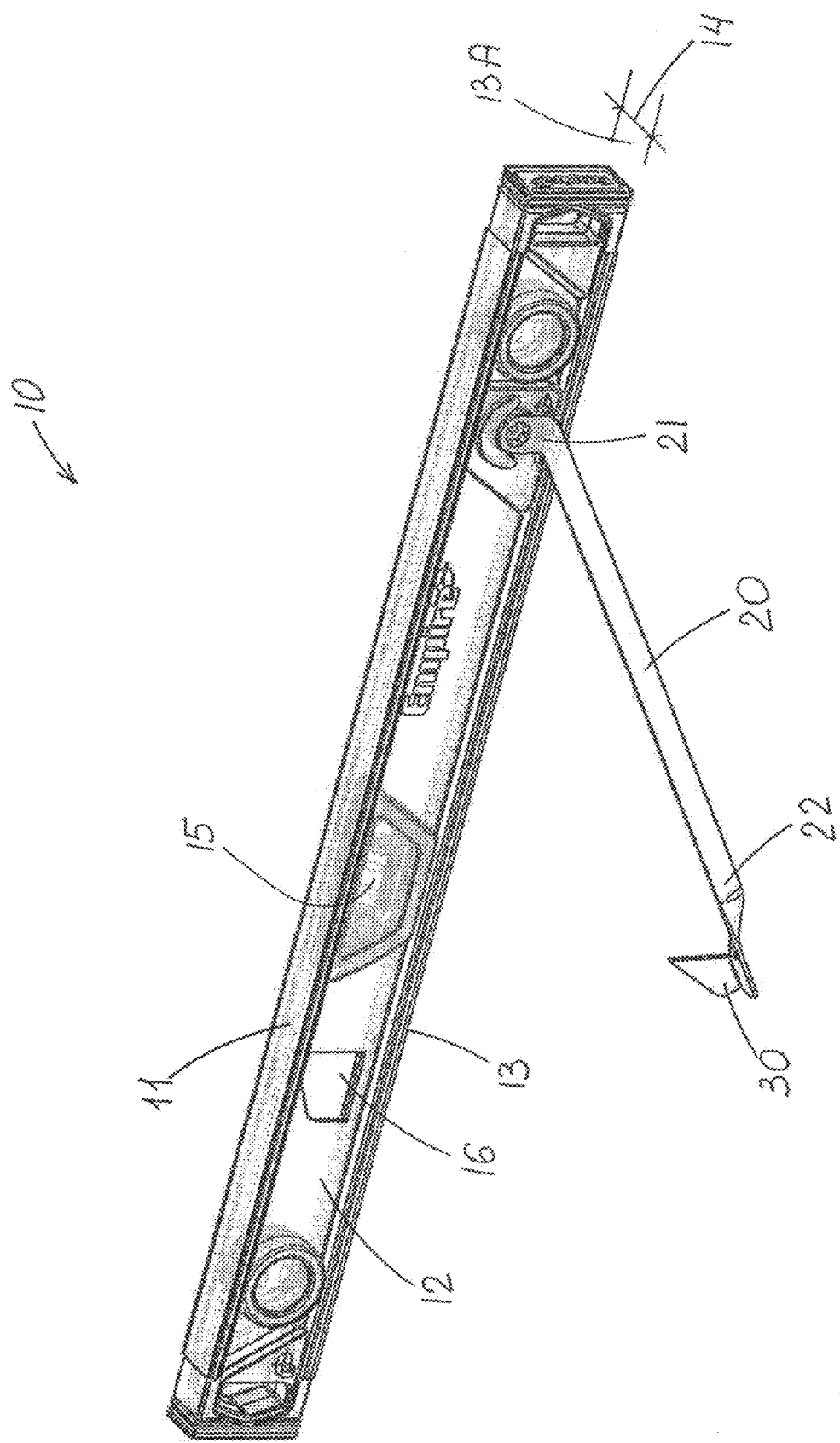

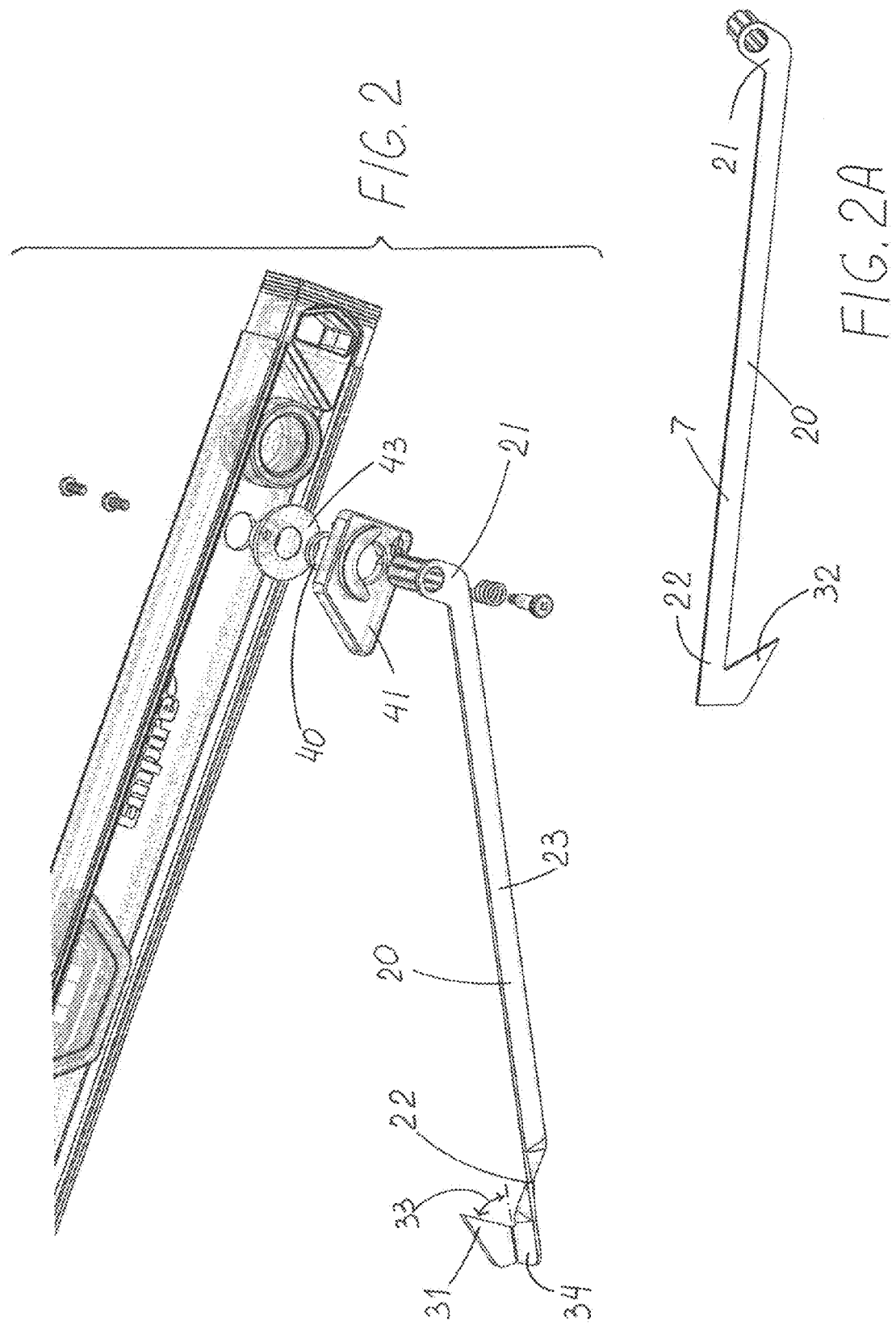

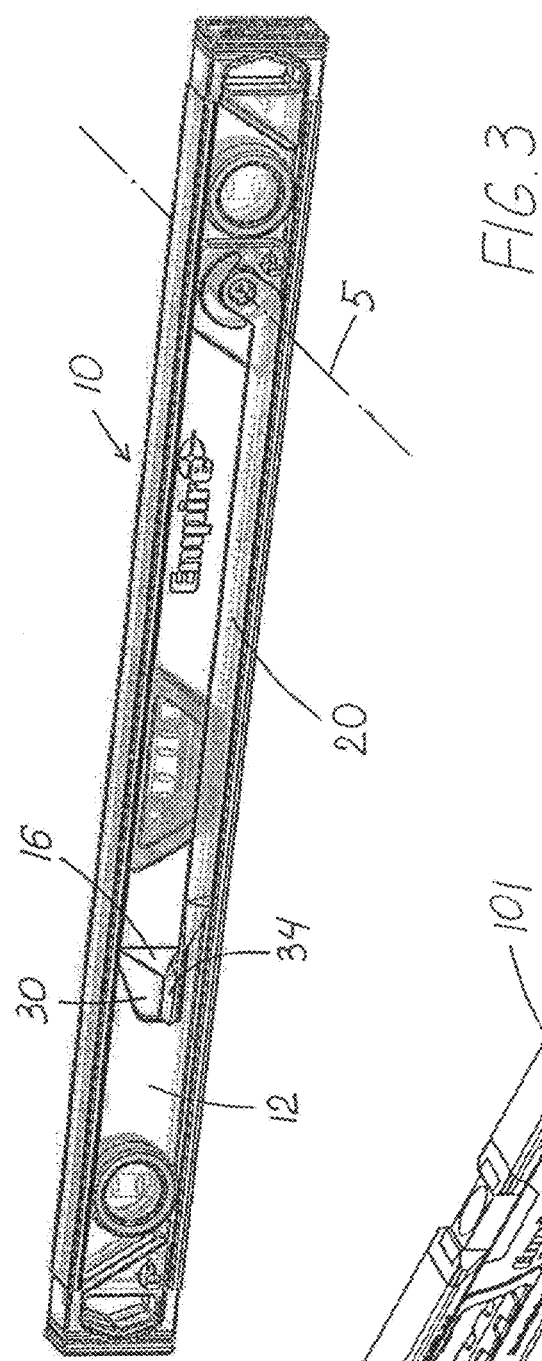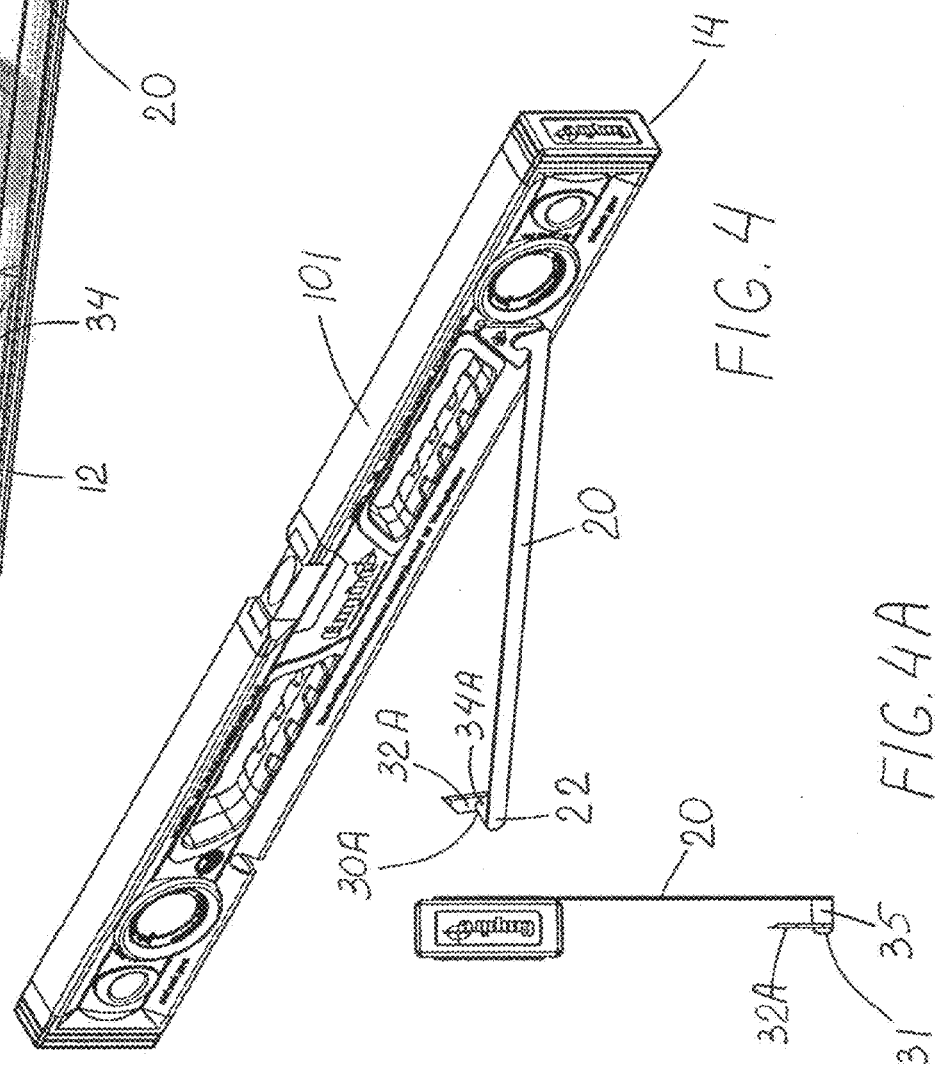

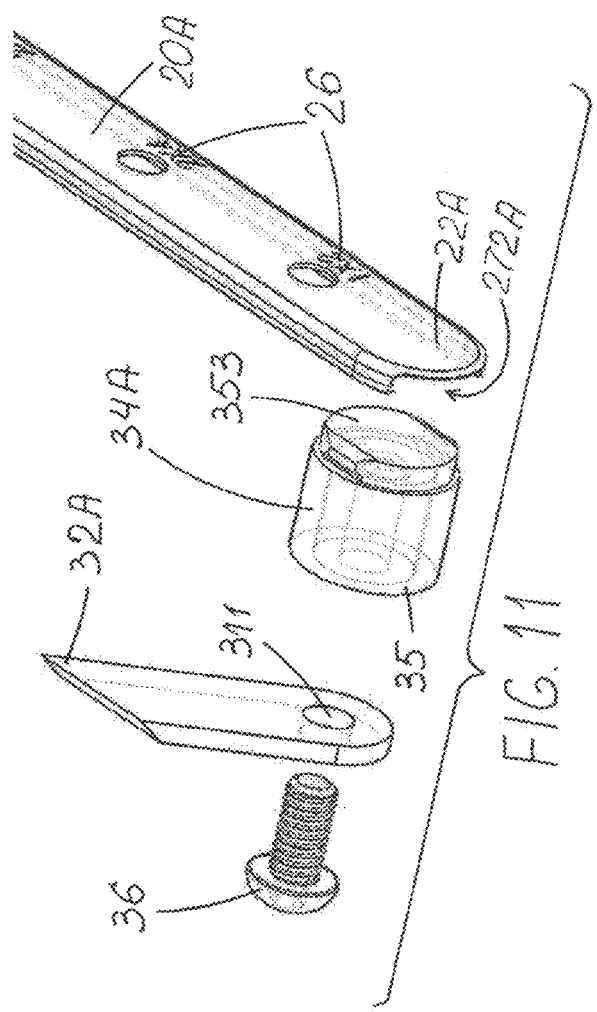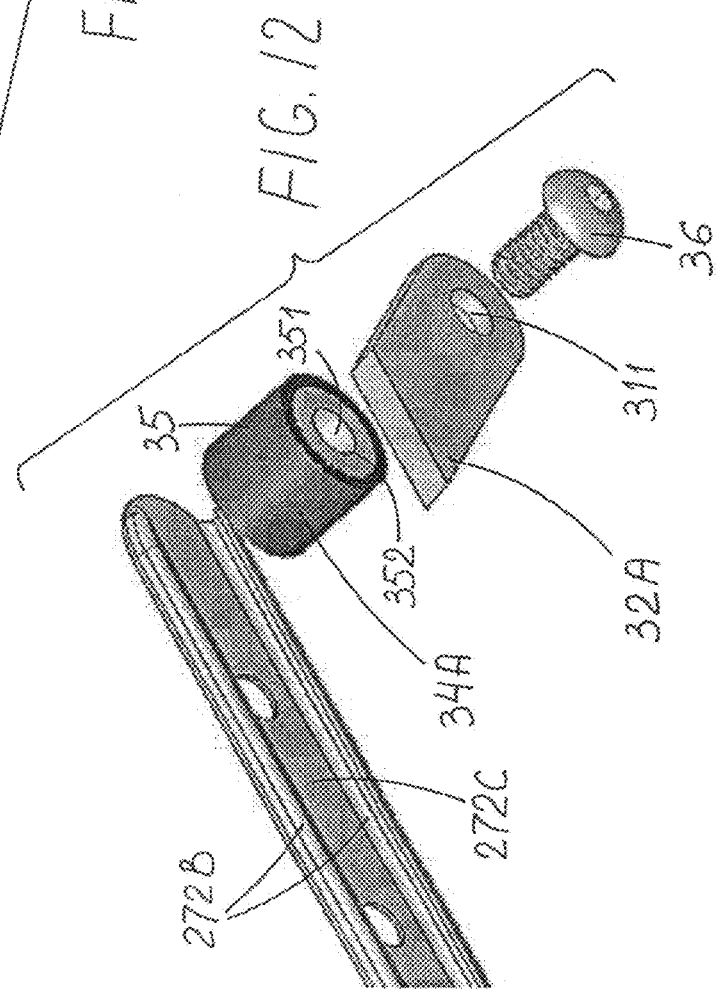

HANDS-FREE LONG LEVEL

FIELD OF THE INVENTION

This invention relates to levels and, more particularly, to levels and devices for holding levels against structural members for hands-free gauging of structural-member orientation.

BACKGROUND OF THE INVENTION

In the construction industry, levels are used to ensure that structural members are installed in their exact intended orientations. Some examples of such structural members are vertical and horizontal studs which have to be positioned as close to their respective plumb and level orientations as possible. In some cases, levels are also used to orient studs or other structural members at specific angles. In such situations two people are often involved in the process of stud installation, because one person holds the level against the structural member while the other person adjusts structural-member orientation and secures it in the proper orientation.

Very often a person who works alone needs to gauge a structural member such as a stud for its vertical orientation. This task becomes difficult because the holding on the level and the fastening of the stud typically have to be done simultaneously. Even if a sole worker were able to gauge the stud with one hand while fastening the stud with the other, such task would require an extra physical strain which increases the risk of injury and makes the operation much slower than desired and may still result in inaccurate orientation of the stud.

There have been various devices that have offered certain support for levels against structural members, but such devices have problems or disadvantages rendering them of little use in most situations.

One example of such devices is described in U.S. Pat. No. 3,296,708 to Moody. The Moody device, however, is designed for use with walls which have either a plurality of holes therethrough or an apertured mesh such that the Moody device can engage the holes or the mesh apertures to secure the level against the wall. The Moody device would not secure a level to a stud. Furthermore, the Moody device is not usable for securing a level in orientations other than vertical such as holding the level to the bottom of a generally horizontally oriented structural member.

Another example of such devices is described in U.S. Pat. No. 5,088,205 to Egbert. The Egbert device requires special manipulation with an adjustable gripping element. Such gripping element, depending on its orientation with respect to an arm, is either freely slidable along the arm or is held in place thereon. The Egbert device requires precise positioning of the gripping element to secure a level against a stud or other object. The level, however, can become easily disengaged from the stud if the gripping element is not in its correct position or if such position changes due to adjustment movements of the level or the stud. Such disengagement would result in unfortunate falling of the level which may become damaged or completely broken.

Yet another example of a device intended for holding a level against a structural member is described in U.S. Pat. No. 5,815,937 to Glorioso, Jr. The Glorioso device would not be operable in the intended manner described in the Glorioso patent. More specifically, despite its rather complicated construction the Glorioso device, as shown, would not hold the level against a structural component, at least because spring 146, by virtue of its manner of mounting, would fail to draw the arm against the object to be gauged.

In summary, there is a need for an improved level which is held securely against a stud or other structural member and which overcomes all of the aforementioned problems.

OBJECTS OF THE INVENTION

It is an object of the invention to provide an improved level which is held securely against a stud or other structural member and which overcomes some of the problems and shortcomings of the prior art, including those referred to above.

Another object of this invention is to provide a level allowing easy hands-free operation, such that a person working alone can install studs and similar structural elements quickly and without any need for a helper.

Another object of the invention is to provide a level which is easily secured against a stud.

Another object of the invention is to provide a level which is reliably held against the stud with minimal chances for accidental disengagement.

Yet another object, of the invention is to provide a level which can be held against structural members of various sizes and configurations.

Still another object of the invention is to provide a level of extended length which is reliably held against the stud with minimal chances for accidental disengagement.

How these and other objects are accomplished will become apparent from the following descriptions and the drawings.

SUMMARY OF THE INVENTION

This invention, which will be described in detail below, is an improvement in levels for gauging stud orientation, or the orientation of a wide variety of structural members. While there is much reference in this document to studs, such as the common wooden studs used in building framing, the term "stud" is not to be taken as a limiting term when it comes to the usefulness of the invention. Use with wooden structural members, metal structural elements, or structural elements of other materials is contemplated.

The inventive level, which maybe a box level, I-beam level or other level, is of the type including an elongate frame with two side-faces and at least one main reference surface which extends therealong and has a mainwidth. A level indicator is secured to the frame. The level is of the type further including a support arm to facilitate holding of the reference surface against a stud.

The inventive level has an extended frame length such as 72", 78", 96", etc. Levels of such lengths are also heavier, of course, than shorter levels. The inventive level includes two support arms and a coordinating arm. Each support arm has a proximal end and extends to a free distal end to which an end member is secured. The proximal ends are pivotably secured to the frame about spaced-apart proximal pivot axes each intersecting the side-faces such that the distal ends and end members are movable between storage positions along one of the side-faces and use positions beyond the reference surface and stud. The proximal pivot axes are preferably substantially equally spaced from the reference surface along the side-faces. The coordinating arm is substantially parallel to the main reference surface and is pivotably secured to each of the support arms at positions offset from the proximal axes for synchronous movement of the support arms. Each end member extends from a respective one of the distal ends crosswise with respect to the mainwidth and terminates in a stud-engaging portion which extends in a direction intersecting the plane of the reference surface. When the reference surface is against a stud surface the stud-engaging portions engage the opposite side of the stud for hands-free holding of the level thereagainst.

The level preferably includes a coil spring about each proximal pivot axis biasing the corresponding distal end and end member to the storage position. Each coil spring has first and second spring-ends. The first spring-end is held in fixed position with respect to the frame. The proximal end of each support arm preferably includes a coil-spring-engaging portion which engages the second spring-end of the corresponding coil spring.

In some preferred embodiments, including those described in the paragraph above, the proximal end of each support arm is preferably axially biased toward the side-face of the support-arm storage position and is axially depressible to the support-arm pivot use position.

In preferred embodiments, the stud-engaging portion of each end member is a pointed end for piercing engagement with the stud. The pointed ends allow for secure holding of the level. Such secure holding is stable enough that the level may be positioned below a stud and remain securely against the stud despite impacts such as caused by hammering.

Each pointed end preferably extends at an acute angle with respect to the direction of the corresponding support arm such that, when engaged with a substantially vertical stud at a position above the pivot axis, gravity facilitates the hands-free holding. Each end member also preferably includes a cross-portion extending from the distal end of the corresponding arm crosswise with respect to the mainwidth to the corresponding stud-engaging portion. Each stud-engaging portion is preferably substantially perpendicular to the corresponding cross-portion.

In some alternative embodiments, the stud-engaging portions may extend directly from the corresponding distal ends diagonally in parallel directions which are both crosswise with respect to the mainwidth and intersecting the reference-surface plane.

In some embodiments, each end member is a friction member for frictional engagement with the stud. Such embodiments are usable for gauging finished objects, such as furniture, doors or windows. Such frictional engagement is also useful for various structural elements which are not easily pierced as in case of metal structural members.

The side-face along which the support arms are in their storage positions is preferably recessed such that the support arms and end members are recessed in their storage positions.

In some preferred embodiments, each arm has an adjustable arm-length such that its corresponding stud-engaging portion is engageable along the middle third of a corresponding half of the length of the level frame, despite being used with studs of different sizes (1×2's, 2×4's, 2×6's, 2×8's, etc.). In other words, each arm is adjustable such that contact of the stud-engaging portion with the stud may be achieved at a contact position such that a perpendicular line from the reference surface to the contact position will extend from the reference surface at a position in the middle third of the corresponding half of the frame length, and preferably as close as possible to the mid-point of that corresponding half of the frame length. The use of the adjustable arm-length feature allows for setting arm-lengths to accommodate the stud, sixes (based on the distance from the reference surface to the surface of the stud engaged by the stud-engaging portion).

The arm-length of each arm is preferably adjustable to a plurality of specific positions each of which corresponds to a specific stud size. Each arm preferably includes arm-length markings indicating the corresponding stud size.

The support arm with extendable arm-length preferably includes at least two interconnected length-sections. Each such support arm further preferably includes at least one locking projection on one of its length-section and a plurality of apertures spaced along the other one of the length-sections to receive the locking projection therethrough to set a selected specific arm-length. The locking projection is preferably outwardly biased such that it extends through the aperture for secure connection. One example of such biasing is a spring-loaded nub that allows for depressing the nub into the aperture to adjust the arm-length. The nub securely extends through the aperture to firmly maintain the desired arm-length.

In some embodiments, each support arm is a single piece. Each end member may also be a single piece. Each such support arm and the corresponding end member preferably form a single piece.

BRIEF DESCRIPTION OF THE DRAWINGS

FIG. 1 is a perspective view of one embodiment of a level of this invention with a single support arm in its pivoting use position.

FIG. 2 is a fragmentary exploded perspective view showing the arm-mounting arrangement of the support arm as in FIG. 1 to the frame.

FIG. 2A is a perspective view of a blank of the single-piece support arm as in FIG. 1 prior to its shaping into the support-arm configuration.

FIG. 3 is a perspective view of the level of FIG. 1 with the support arm in its storage position.

FIG. 4 is a perspective view of another embodiment of the level with a single support arm which is similar to the level of FIG. 1 except that it has a different end member.

FIG. 4A is a end-elevation view of the level of FIG. 4.

FIG. 11 is an enlarged fragmentary exploded perspective view of the stud-engaging end member of the support arm shown in FIG. 7.

FIG. 12 is a fragmentary perspective view as in FIG. 11 but from a different angle to show aspects of the end member.

FIG. 13 is another exploded fragmentary perspective view illustrating the interconnection of the arm length-sections and the end member of the support arm shown in FIG. 7.

DETAILED DESCRIPTION OF PREFERRED EMBODIMENTS

Figure 16:
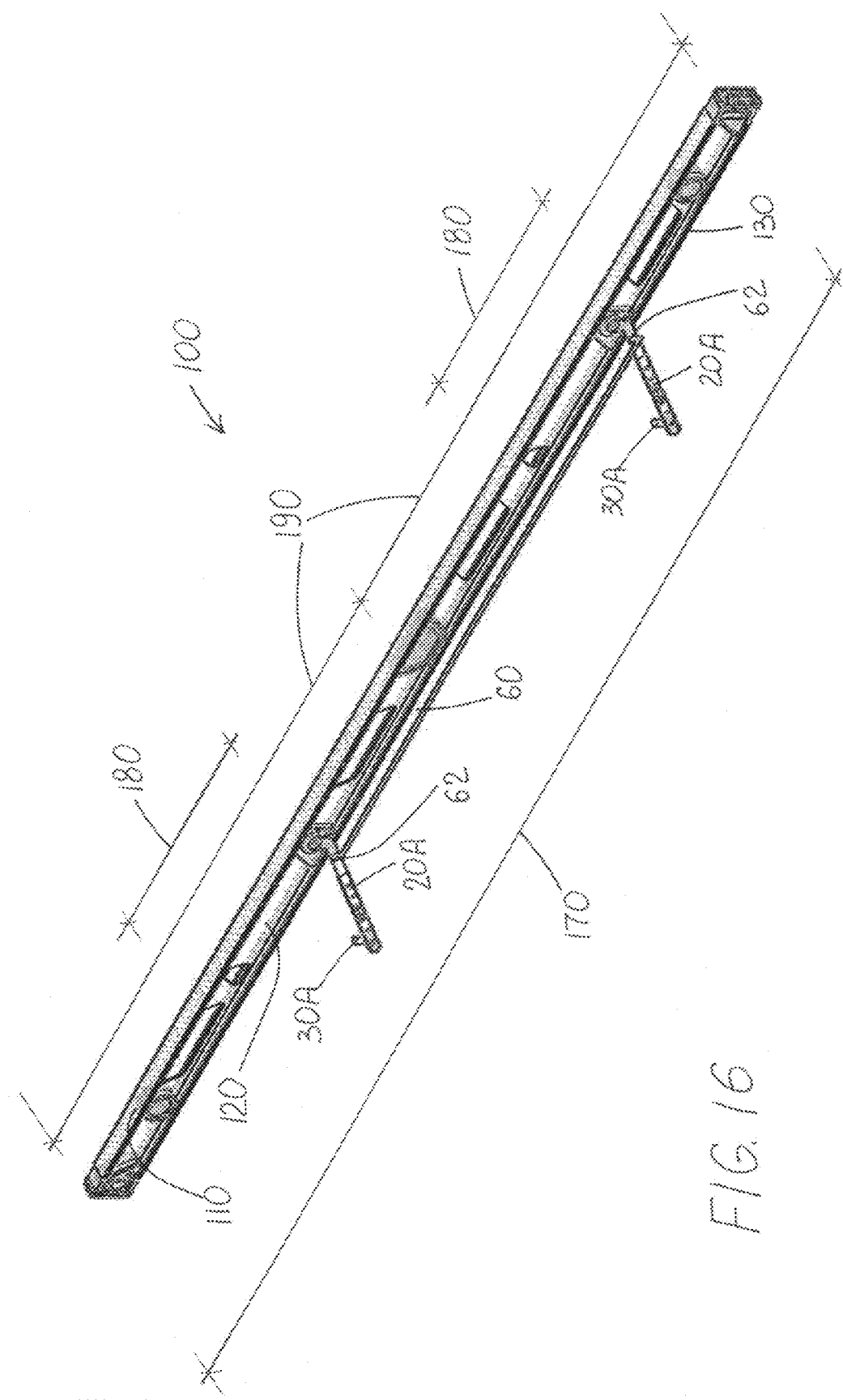
FIG. 16 is a perspective view of a level of this invention with two support arms in their pivoting use positions.
Figure 17:
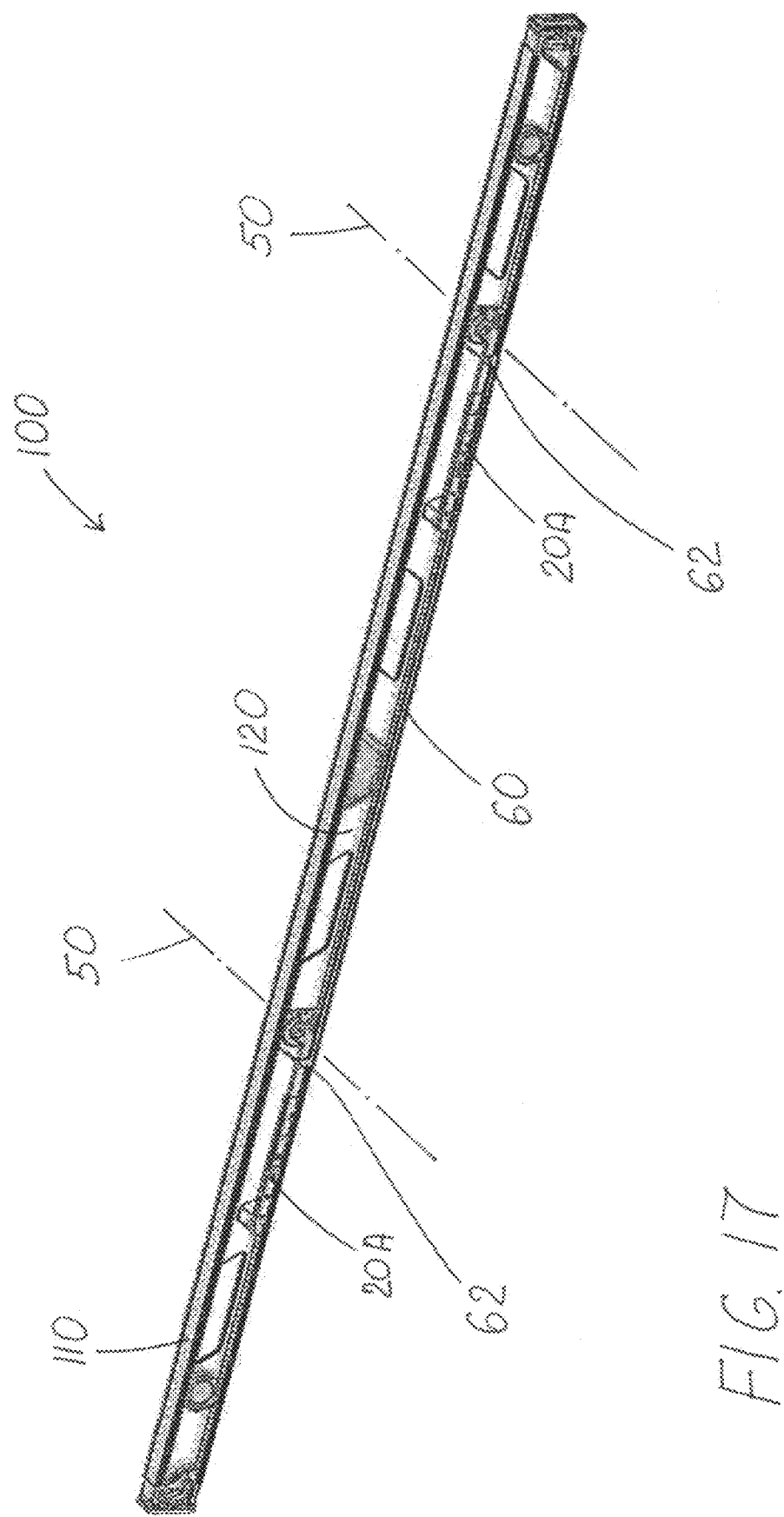
FIG. 17 is a perspective view of the level of FIG. 16 with support arms in their storage position.

FIGS. 16 and 17 show an improved level 100 for gauging orientation of a stud 1. Level 100 is of a type that includes an elongate frame 110 with two side-faces 120 and at least one main reference surface 130 which extends along side-faces 120 and has a mainwidth 14. A level indicator 15 is secured to frame 110. Inventive level 100 further includes two support arms 20 to facilitate holding of reference surface 130 against stud 1, and a coordinating arm 60.

FIGS. 1, 3, 4-6, 8, 14 and 15 show level 10 which has an elongate frame 11 with two side-faces 12 and at least one main reference surface 13 which extends along side-faces and has a mainwidth 14. Level 10 has one support arm 20 of the same type as each of support arms 20 in level 100. Both level 10 and 100 may have support arms 20 or 20A as well as different types of end members. Levels 100 and 10 have common elements and common element interconnections. Element numbers for common elements in level 100 are same as in level 10. In case of differences between common elements, elements for level 100 are identified by same numbers multiplied by 10, for example frame 11 and 110, side faces 12 and 120, etc. In describing features of support arms, end members or arm-mounting arrangements, lower element numbers such as 11, 12 or 13 are used for convenience.

Figure 5:
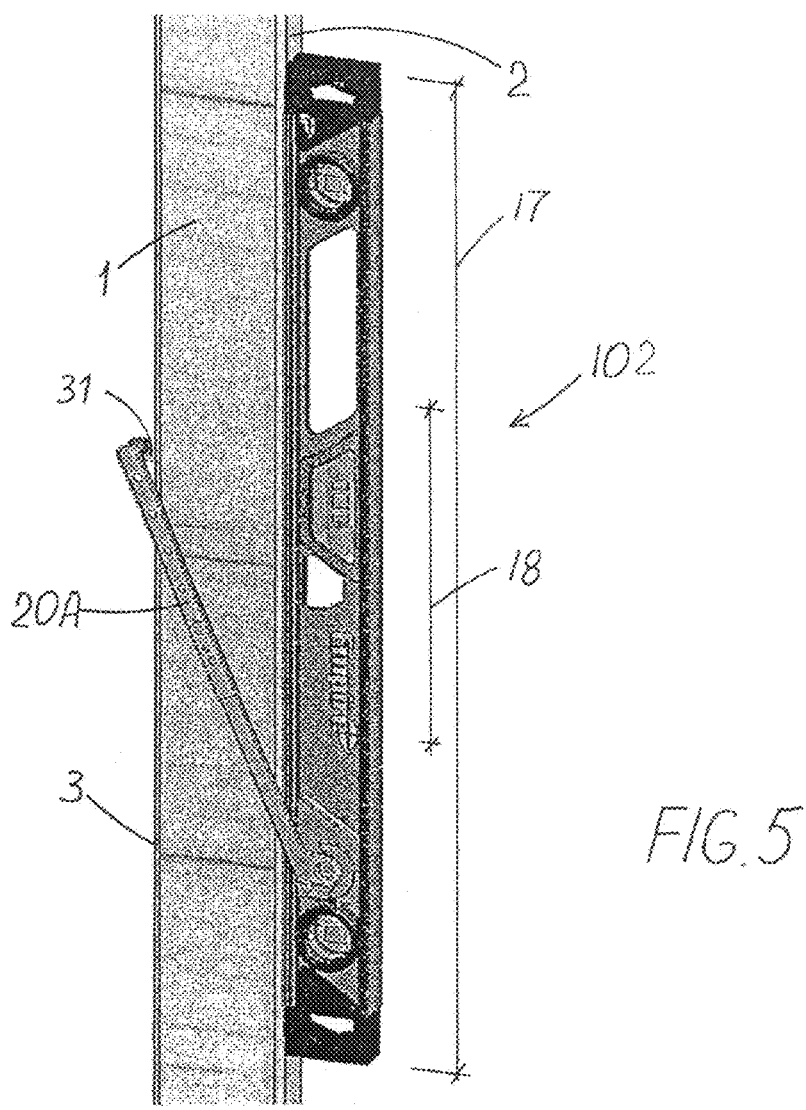
FIG. 5 is a perspective view of a level of the present invention with a single support arm which has an adjustable arm-length, the level being shown against a vertical stud.
Figure 6:
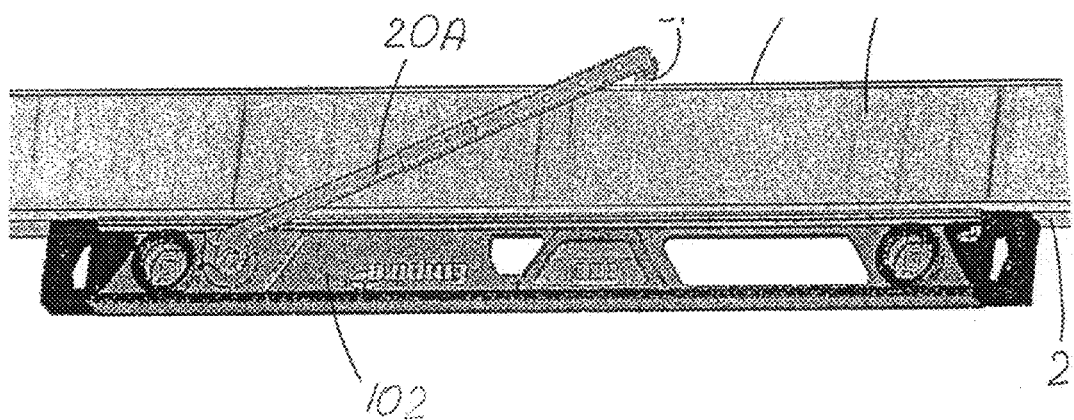
FIG. 6 is a perspective view of the level as in FIG. 5 shown against a horizontal stud.
Figure 7:
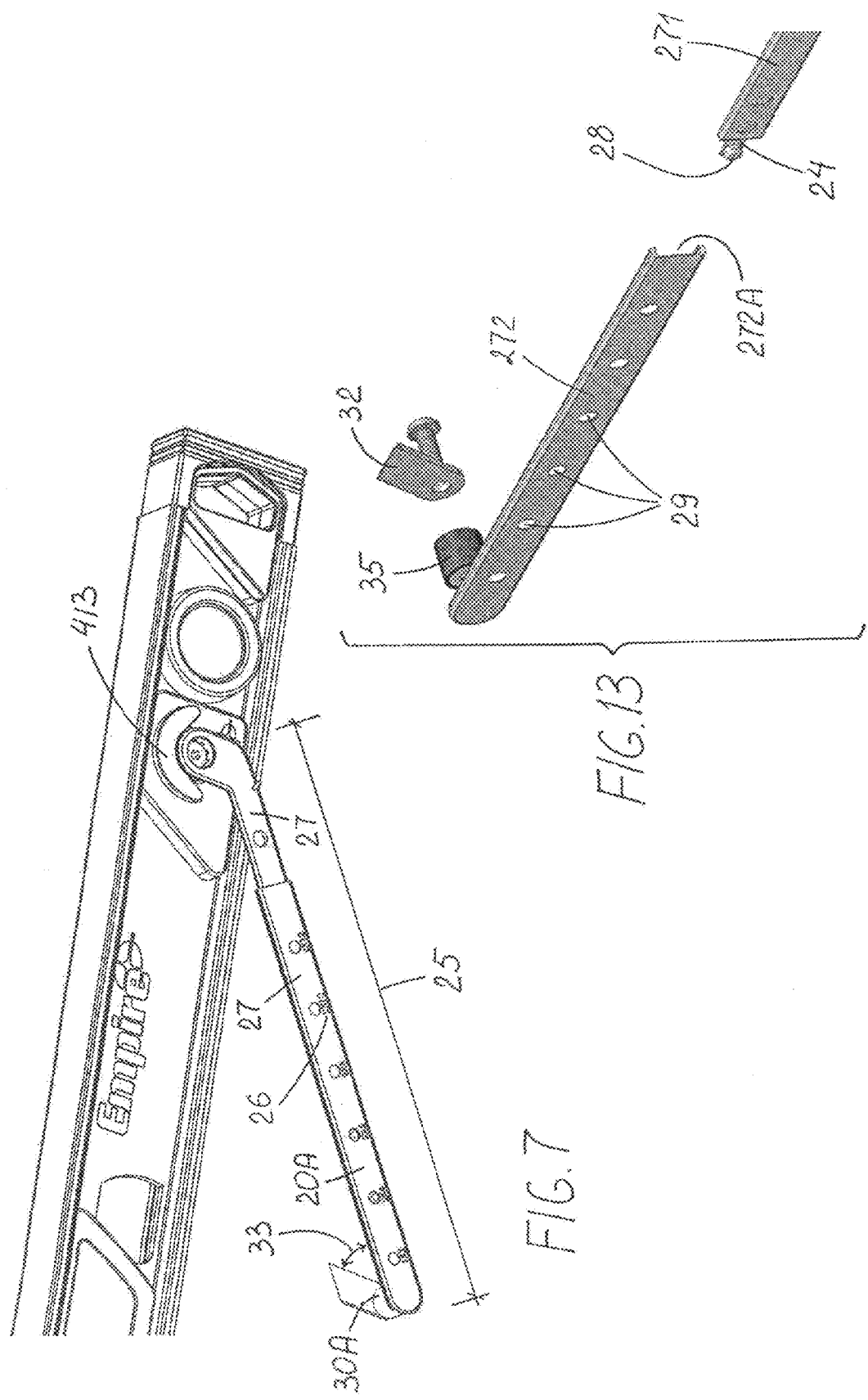
FIG. 7 is a perspective fragmentary view better showing the support arm as in level of FIG. 5.

As best seen in FIGS. 2, 4 and 7, support arm 20 has a proximal end 21 and extends to a free distal end 22 to which an end member 30 is secured. Proximal end 21 is pivotably secured to frame 11 about a pivot axis 5 intersecting side-faces 12 such that distal end 22 and end member 30 are movable between a storage position (illustrated in FIGS. 3 and 14) along one of side-faces 12 and a use position beyond reference surface 13 and stud 1, as illustrated in FIGS. 1, 5 and 6.

In level 100, proximal ends 21 are pivotably secured to frame 110 about spaced-apart proximal pivot axes 50 each intersecting side-faces 120. Proximal pivot axes 50 are substantially equally spaced from reference surface 130 along side-faces 120. Coordinating arm 60 is substantially parallel to main reference surface 130 and is pivotably secured to each of support arms 20 at positions 62 offset from proximal axes 50 for synchronous movement of support arms 20A.

As seen in FIG. 17, in storage position coordinating arm 60 rests along one of side-faces 120. FIG. 16 shows that pivot positions 62 of coordinating arm 60 and proximal pivot axis 50 of support arms 20A form a parallelogram. Therefore, to move support arms 20A to a desired use position, coordinating arm 60 is simply moved away from side-face 120 of its storage position. The moving of coordinating arm 60 simultaneously pivots both support arms 20A and pulls distal ends 22 and end members 30A into their use position beyond reference surface 130 and stud 1. Thus, both support arms 20A can be operated with one hand by moving coordinating arm 60.

End member 30 extends from distal end 22 crosswise with respect to mainwidth 14 and terminates in a stud-engaging portion 31 extending in a direction intersecting the plane 13A of reference surface 13. FIGS. 6 and 7 illustrate that, when reference surface 13 is against a stud surface 2, stud-engaging portion 31 engages the opposite side 3 of stud 1 for hands-free holding of level 10 against stud 1.

As best seen in FIGS. 1 and 11, stud-engaging portion 31 of end member 30 may be a pointed end 32 for piercing engagement with the stud. Pointed end 32 allows for such secure holding of level 10 to stud 1 that level 10 may be positioned below stud 1 and that level 10 remains securely held against stud 1 even when stud 1 is affected by various impacts such as a hammer shock. FIG. 6 illustrates level 102 held against a bottom surface of horizontally-positioned stud 1. Pointed end 32 preferably extends at an acute angle 33 with respect to the direction of support arm 20 such that, when engaged with a substantially vertical stud 1 at a position above pivot axis 5, as shown in FIG. 5, gravity facilitates the hands-free holding. End member 30 also includes a cross-portion 34 which extends from distal end 22 of arm 20 crosswise with respect to mainwidth 14 to stud-engaging portion 31. FIGS. 2, 4 and 7 show stud-engaging portion 31 being substantially perpendicular to cross-portion 34.

Figure 8:
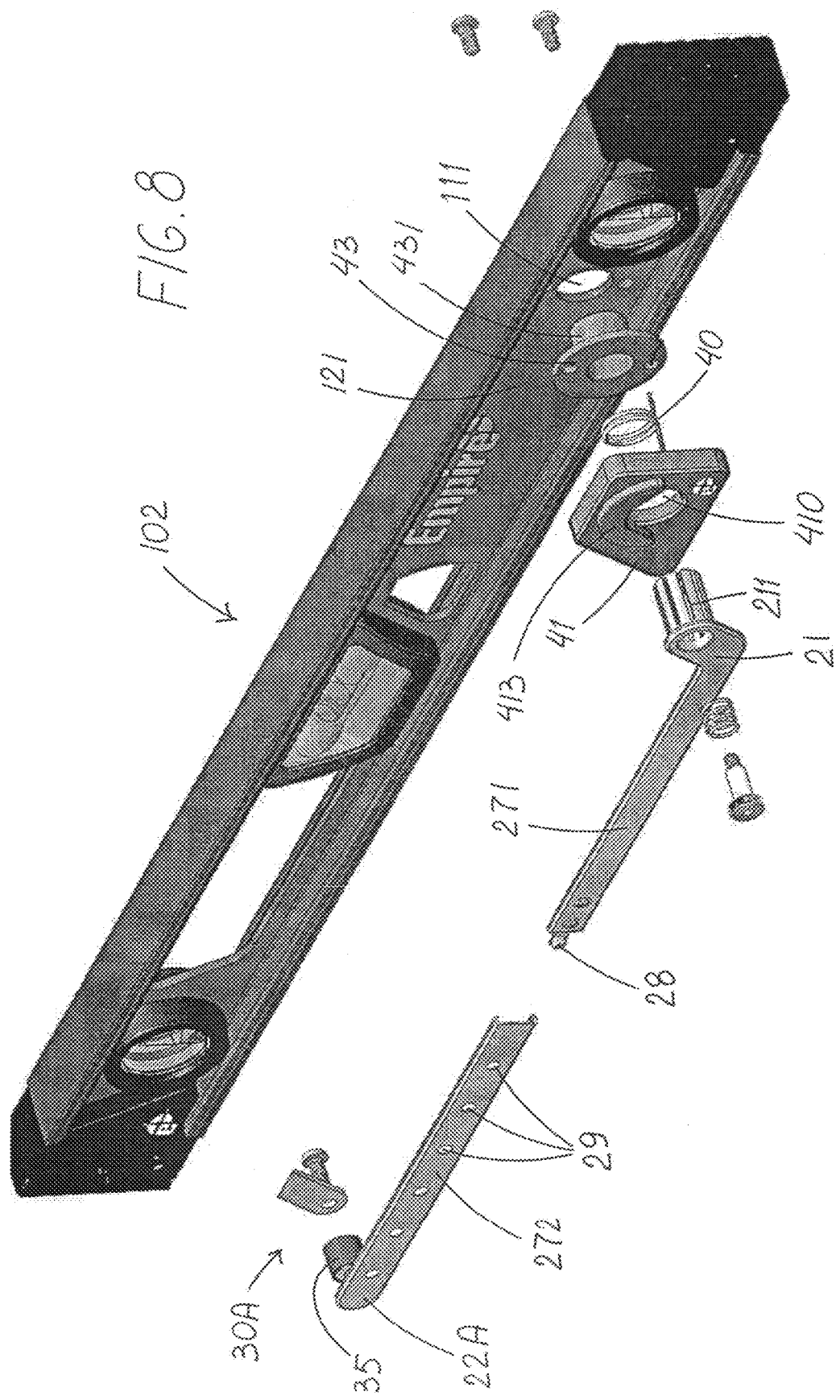
FIG. 8 is an exploded perspective view of the level of FIG. 5.
Figure 9:
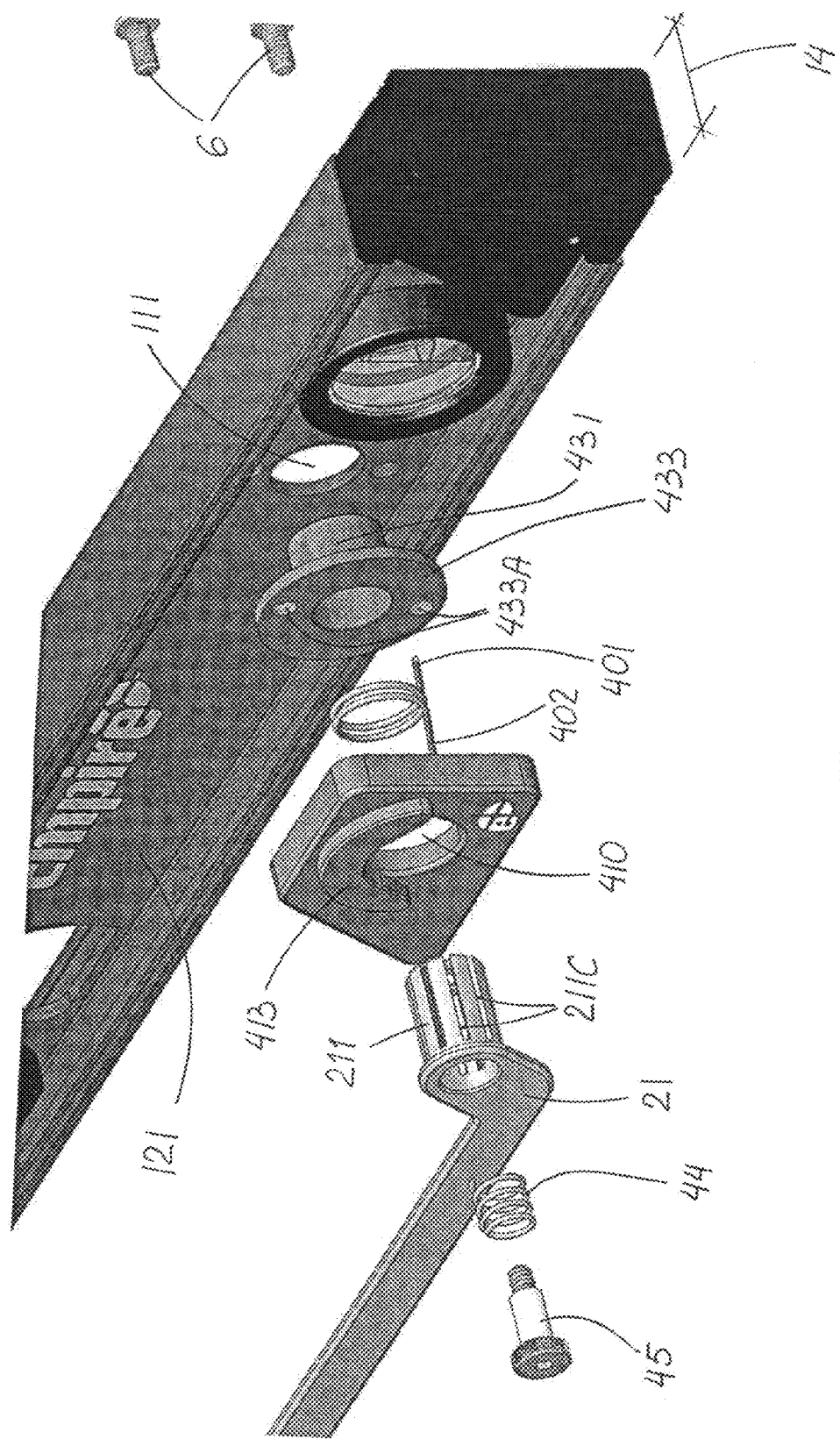
FIG. 9 is an enlarged fragmentary perspective view showing the arm-mounting arrangement to the frame.
Figure 10:
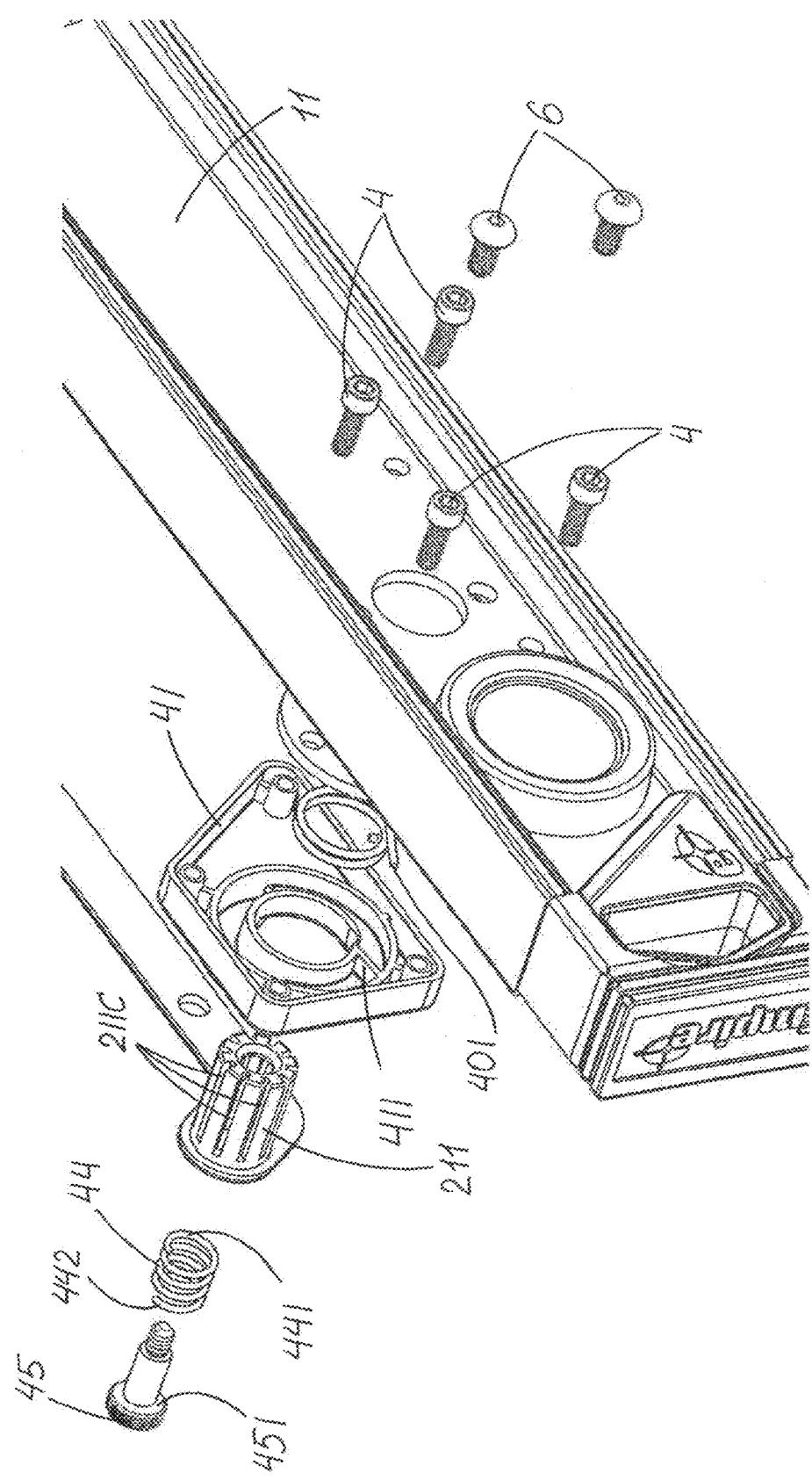
FIGS. 10 and 10A are yet other fragmentary exploded perspective views of the arm-mounting arrangement to the frame, shown from different angles.
Figure 10A:
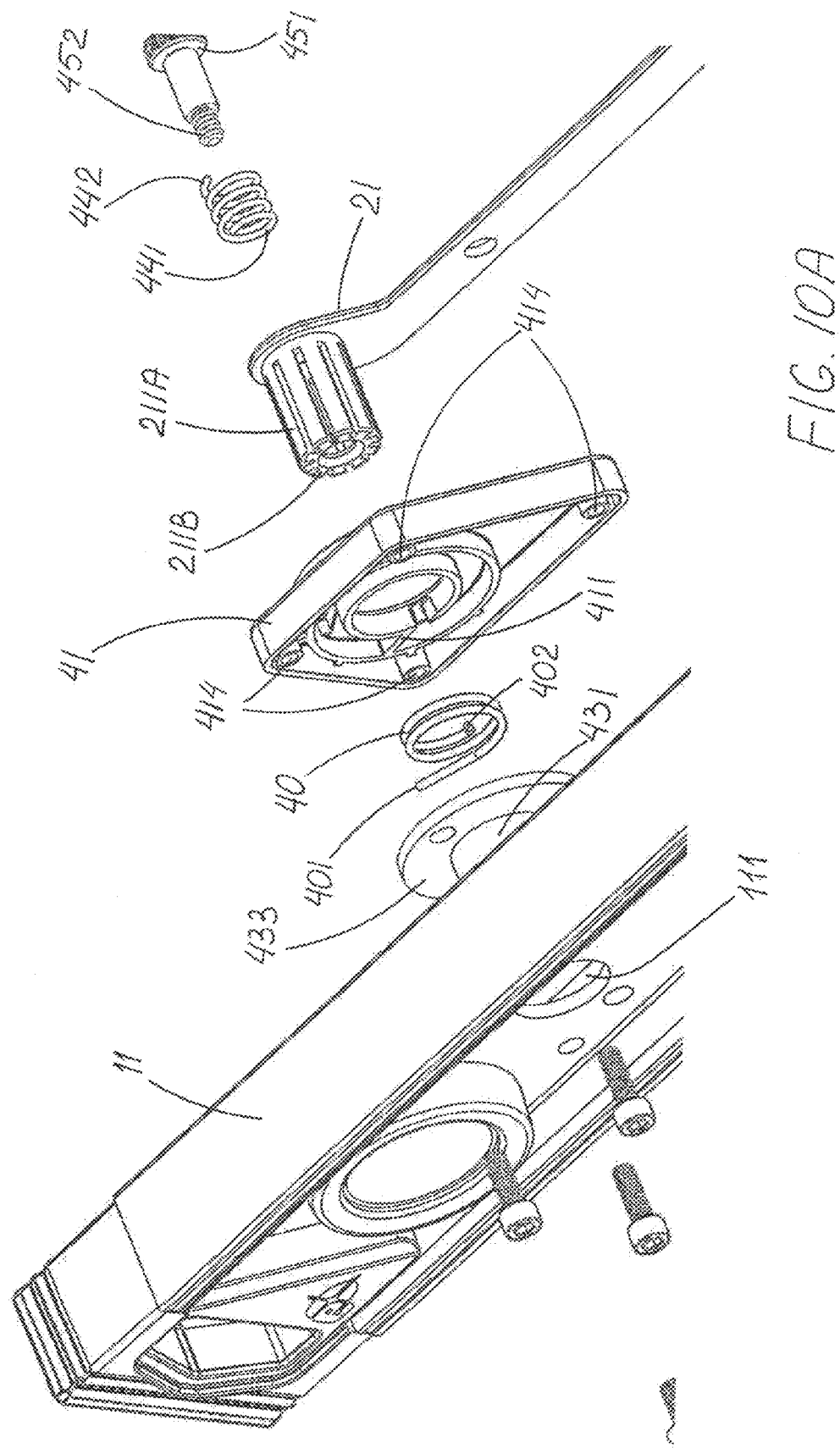

FIGS. 8, 11 and 12 show an embodiment with end member 30A which has a friction member 35 for frictional engagement with stud 1. FIGS. 11 and 12 best illustrate friction member 35 in form of cross-member 34A which is coated with a friction material such as rubber or any other suitable substance. When use of friction member 35 is desired to hold level 10 against an object, pointed end 32 can be rotated or removed to open friction member 35 for engagement with such object.

Figure 14:
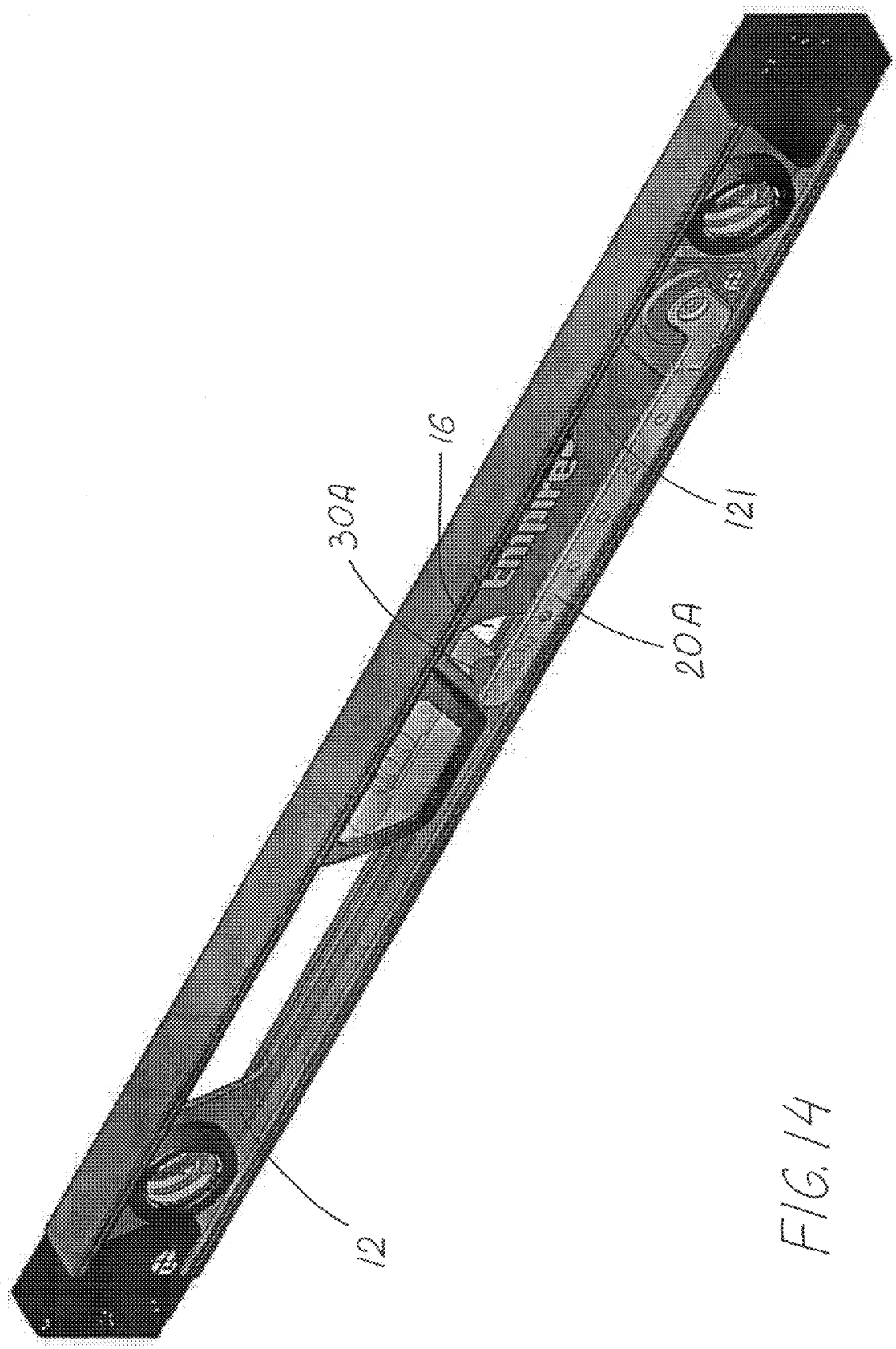
FIG. 14 is a perspective view of the level of FIG. 5 with the support arm in its storage position.
Figure 15:
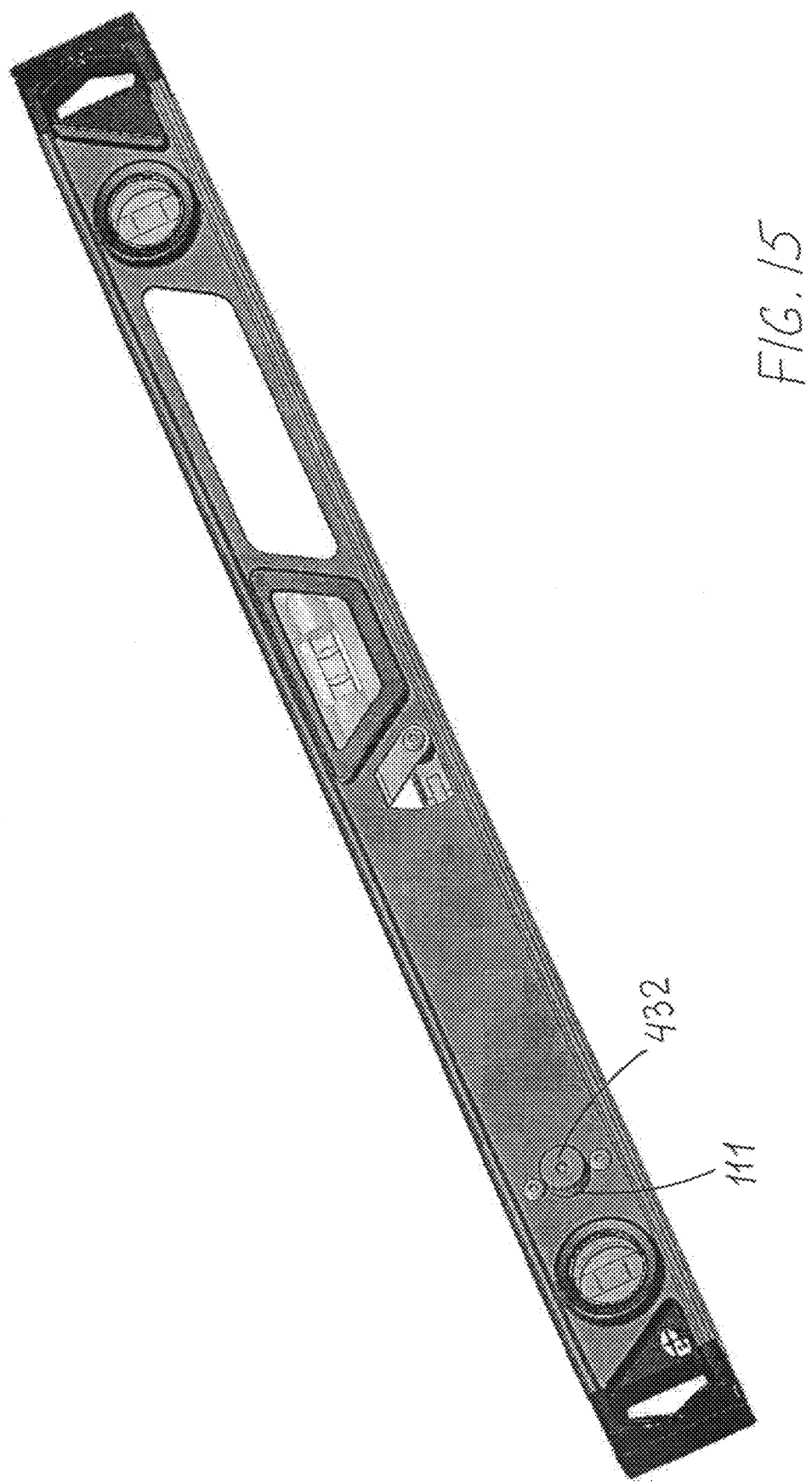
FIG. 15 is a perspective view of the other side-face of the level of FIG. 14.

FIGS. 3 and 14 show side-face 121, along which support arm 20 in its storage position, being recessed such that support arm 20 and end member 30 are recessed in their storage position. As further seen in FIGS. 3 and 14, frame 11 defines an aperture 16 which receives end member 30 for storage.

FIGS. 5-14 show support arm 20A which has an adjustable arm-length 25 such that stud-engaging portion 31 is engageable with studs of different sizes along the middle third 18 of the frame length 17. Adjustable arm-length 25 allows for setting an appropriate arm-length based on a stud size. The stud size defines a dimension between stud surface 2 and opposite side 3.

Arm-length 25 is adjustable to a plurality of specific positions each of which corresponds to a specific stud size. As best seen in FIGS. 7 and 11, arm 20A includes arm-length markings 26 indicating the corresponding stud size (1×2's, 2×4's, 2×6's, 2×8's, etc.). In other words, arm 20A is adjustable such that contact of the stud-engaging portion with the stud may be achieved at a contact position such that, in level 10, a perpendicular line from reference surface 13 to the contact position will extend from reference surface 13 at a position in middle third 18 of frame length 17, and preferably as close as possible to the mid-point of frame length 17. And, in level 100, which has frame 110 with frame length 170 greater than frame length 17 of frame 11, a perpendicular line from reference surface 130 to the contact position will extend from reference surface 130 at a position in the middle third 180 of the corresponding half 190 of frame length 170, and preferably as close as possible to the mid-point of that corresponding half 190 of frame length 170. The use of adjustable arm-length 25 allows for setting arm-length 25 to accommodate the stud size (based on the distance from the reference surface to the surface of the stud engaged by the stud-engaging portion).

FIGS. 8 and 13 best illustrate that support arm 20A includes two interconnected length-sections 27. Support arm 20A further includes a locking projection 28 on one of length-sections 27 and apertures 29 spaced along the other one of length-sections 27 to receive locking projection 28 therethrough for setting a selected specific arm-length 25. Locking projection 28 is biased to extend through the aperture for secure connection. As best seen in FIG. 13, locking projection 28 is mounted on a detent member 24 secured to the corresponding length-section 27. Detent member 24 is made of a spring material which biases locking projection 28 into aperture 29. Such detent member 24 is depressible to free locking projection 28 from aperture 29 for movement along arm-length 25 to engage another aperture 29 for adjusting arm-length 25 to the selected length.

FIGS. 1-3 show level 10 with support arm 20 being a single piece and end member 30 being also a single piece. Both support arm 20 and end member 30 together form a single piece; i.e., support arm 20 and end member 30 are together formed of one elongate piece of metal 7 (FIG. 2A). Support arm 20 shown in FIG. 2 has a substantially flat elongate structure defining arm-side surfaces 23 which are substantially parallel to side face 12 of frame 11. In support arm 20, distal end 22A is twisted about 90° to change orientation of piece of metal 7 by about 90° to continue as cross-portion 34 which extends substantially perpendicular to side-face 12 and crosswise mainwidth 14 to stud-engaging portion 31. Stud-engaging portion 31 extends substantially parallel to side-face 12 in the direction intersecting reference-surface plane 13A.

FIGS. 4 and 4A show level 101 with support arm 20 being a single piece. End member 30A is assembled of separate pointed end 32A and cross-portion 34A secured to distal end 22 of arm 20. Cross-portion 34A in level 101 is friction member 35. FIGS. 11-13 best show that cross-portion 34A friction member 35 has a bore hole 351 with a bore-hole opening 352 facing pointed end 32A. Pointed end 32A has an aperture 311 which corresponds to bore hole 351. A screw 36 extends through aperture 311 into bore hole 351 to secure pointed end 32A to friction member 35. When desired to use friction member for engaging an object need to be gauged, pointed end 32A can be taken off by simply removing screw 36.

FIG. 8 shows yet another embodiment of inventive level 102 which has one support arm 20A. FIGS. 7, 8 and 13 best show support arm 20A made of two interconnected length-sections 27. One length-section 271 extends from proximal end 21 to terminate with locking projection 28. Locking projection 28 is on detent member 24 secured to length-section 271 for connection with length-section 272 which extends to distal end 22A. FIGS. 11-13 best illustrate that length-section 272 has a channel 272A formed by two curved sidewalk 272B extending from and along sides of a bottom wall 272C and shaped for secure slidable engagement of length-section 271. Length-sections 271 and 272 are fixed at the selected arm-length 25 by locking projection 28 extending through one of apertures 29 which are made through bottom wall 271C and are spaced therealong.

Support arm 20A has end member 30A with cross-portion 34A being friction member 35 secured to distal end 22A of length-section 272. Friction member 35 has an arm-mounting end-portion 353 which is configured to snugly slide into channel 272A for securement of cross-portion 34A to distal end 22A of arm 20A.

FIGS. 2, 8-10A and 15 illustrate a mounting arrangement of proximal end 21 to frame 11. A coil spring 40 is about pivot axis 5 (or each proximal pivot axis 50) to bias distal end 22 and end member 30 to the storage position. Coil spring 40 has first and second straight spring-ends 401 and 402. Level further includes a cover 41 which has a spring-retaining member 411 for holding first straight spring-end 401 in fixed position with respect to frame 11 (see FIG. 10). Support arm 20 has a coil-spring-engaging portion 211 which extends from proximal end 21 crosswise with respect to mainwidth 14. Spring-engaging portion 211 includes a substantially cylindrical axial portion 211A which terminates with a transverse annular portion 211B. Cylindrical portion 211A has a plurality of slots 211C therealong for biasing engagement of second straight spring-end 402. Cover 41 defines an axial aperture 410 sized to receive spring-engaging portion 211 therethrough for the engagement with coil spring 40. Cover 41 further includes a limiting collar 413 positioned around axial aperture 410 to limit range of pivot of support arm 20. Cover 41 is secured to frame 11 by screws 4 extending through side-faces 12 into screw-receiving portions 414 in cover 41.

The arm-mounting arrangement also includes a base member 43 which has a sleeve portion 431 extending between a closed base-end 432 (FIG. 15) and an outward flange 433. Frame 11 has a sleeve-receiving aperture 111 through side-faces 12. Outward flange 433 is mounted against side-face 121 of the support-arm storage position and has mounting holes 433A which receive screws 6 extending through side-faces 12 to secure base member 43 to frame 11.

Proximal end 21 of support arm 20 is axially biased toward side-face 121 of the support-arm storage position and is axially depressible to a support-arm pivot use position. The arm-mounting arrangement further includes an axial coil spring 44 about a shoulder screw 45 which is positioned inside cylindrical axial portion 211A of spring-engaging portion 211. A first coil-end 441 of the spring 44 is against transverse annular portion 211B and a second coil-end 442 is against a screw head 451. Cylindrical axial portion 211A is in turn positioned through axial aperture 410 in cover 41 inside sleeve portion 431 of base member 43 such that a threaded end 452 of shoulder screw 45 is screwed into closed base-end 432. Therefore, to move support arm 20 into its use position, proximal end 21 is pulled away from frame 11 such that axial spring 44 is depressed to bias proximal end 21 of support arm 20 toward side-face 121 of the storage position.

While the principles of the invention have been shown and described in connection with specific embodiments, it is to be understood that such embodiments are by way of example and are not limiting.

The invention claimed is:

1. In a level for gauging stud orientation, the level including an elongate frame with two side-faces and at least one main reference surface extending therealong and having a main-width, a level indicator secured to the frame, and a support arm to facilitate holding of the reference surface against the stud, the improvement comprising:

two support arms each having a proximal end and extending to a free distal end to which an end member is secured, the proximal ends being pivotably secured to the frame about spaced-apart proximal pivot axes each intersecting the side-faces such that the distal ends and end members are movable between storage positions along one of the side-faces and use positions beyond the reference surface and stud;

a coordinating arm substantially parallel to the main reference surface and pivotably secured to each of the support arms at positions offset from the proximal axes for synchronous movement of the support arms; and each end member extending from a respective one of the distal ends crosswise with respect to the mainwidth and terminating in a stud-engaging portion which extends in a direction intersecting the plane of the reference surface, whereby when the reference surface is against a stud surface the stud-engaging portions engage the opposite side of the stud for hands-free holding of the level thereagainst.

2. The level of claim 1 wherein the proximal pivot axes are substantially equally spaced from the reference surface along the side-faces.

3. The level of claim 1 wherein the stud-engaging portion of each end member is a pointed end for piercing engagement with the stud.

4. The level of claim 3 wherein each pointed end extends at an acute angle with respect to the direction of the corresponding support arm such that, when engaged with a substantially vertical stud at a position above the pivot axis, gravity facilitates the hands-free holding.

5. The level of claim 3 wherein each end member also includes a cross-portion extending from the distal end of the corresponding arm crosswise with respect to the mainwidth to the corresponding stud-engaging portion.

6. The level of claim 5 wherein each stud-engaging portion is substantially perpendicular to the corresponding cross-portion.

7. The level of claim 1 further including a coil spring about each proximal pivot axis biasing the corresponding distal end and end member to the storage position.

8. The level of claim 7 wherein:
each coil spring has first and second spring-ends, the first spring-end being held in fixed position with respect to the frame; and
the proximal end of the support arm includes a coil-spring-engaging portion which engages the second spring-end.

9. The level of claim 8 wherein the proximal end of each support arm is axially biased toward the side-face of the support-arm storage position and is axially depressible to the support-arm pivot use position.

10. The level of claim 1 wherein each end member is a friction member for frictional engagement with the stud.

11. The level of claim 1 wherein the side-face along which the support arms are in their storage positions is recessed such that the support arms and end members are recessed in their storage positions.

12. The level of claim 1 wherein each arm has an adjustable arm-length.

13. The level of claim 12 wherein the arm-length of each arm is adjustable to a plurality of specific positions each of which corresponds to a specific stud size.

14. The level of claim 13 wherein each arm includes arm-length markings indicating the corresponding stud size.

15. The level of claim 12 wherein the support arm includes at least two interconnected length-sections.

16. The level of claim 15 wherein each support arm includes:
at least one locking projection on one of its length-section; and
a plurality of apertures spaced along the other one of the length-sections to receive the locking projection therethrough to set a selected specific arm-length.

17. The level of claim 16 wherein the locking projection is outwardly biased such that it extends through the aperture for secure connection.

18. The level of claim 1 wherein each support arm is a single piece.

19. The level of claim 18 wherein each end member is a single piece.

20. The level of claim 19 wherein each support arm and the corresponding end member form a single piece.

* * * * *